United States Patent [19]

Mason, Jr.

[11] Patent Number: 4,892,213
[45] Date of Patent: Jan. 9, 1990

[54] MICROWAVE COOKING AND SERVING DISH

[76] Inventor: Stanley I. Mason, Jr., 61 River Rd., Weston, Conn. 06883

[21] Appl. No.: 816,351

[22] Filed: Jan. 6, 1986

[51] Int. Cl.$^4$ .......................... B65D 6/02; B65D 21/02; B65D 43/08; H05B 6/80

[52] U.S. Cl. ...................... 220/4 B; 126/390; 219/10.55 E; 206/508; 220/94 A; D7/17

[58] Field of Search ............... 220/4 B, 4 E, 94 A; 206/508; 219/10.55 E; 126/390; 99/247; D7/16, 17, 18

[56] References Cited

U.S. PATENT DOCUMENTS

| | | | |
|---|---|---|---|
| 305,674 | 9/1884 | Dalzell | 220/4 B |
| 797,314 | 8/1905 | Owens | 220/4 B |
| 1,399,702 | 12/1921 | Eaton | 429/100 |
| 1,568,798 | 1/1926 | Caver | 220/4 B |
| 2,336,699 | 12/1943 | Neth | 220/4 E |
| 2,627,991 | 2/1953 | Maersch | 220/4 E |
| 2,695,115 | 11/1954 | Roop | 206/508 |
| 3,360,153 | 12/1967 | Wheaton | 220/4 B |
| 3,825,049 | 7/1974 | Swett | 220/94 A |
| 4,234,097 | 11/1980 | Daenen | 150/55 |
| 4,280,032 | 7/1981 | Levinson | 219/10.55 E |

FOREIGN PATENT DOCUMENTS

| | | | |
|---|---|---|---|
| 1165937 | 10/1958 | France | 220/4 B |
| 679300 | 9/1952 | United Kingdom | 220/4 B |

OTHER PUBLICATIONS

Micochef Brochure received 1-1980.

Primary Examiner—George E. Lowrance
Attorney, Agent, or Firm—Haynes N. Johnson

[57] ABSTRACT

A microwave cooking vessel is formed of two bowl sections, either of which may be the top, and both of which have peripheral lips. The sections interfit through congruent upstanding rims, the outer one of which rests upon the lip of the other bowl, thus creating spacing between the lips. Pairs of lip extensions at the ends, spaced as above, serve as handles. Raised, interfitting circular ridges on the top and bottom of the bowls permit stacking of vessels and permit one bowl to act as a trivet for the other.

2 Claims, 3 Drawing Sheets

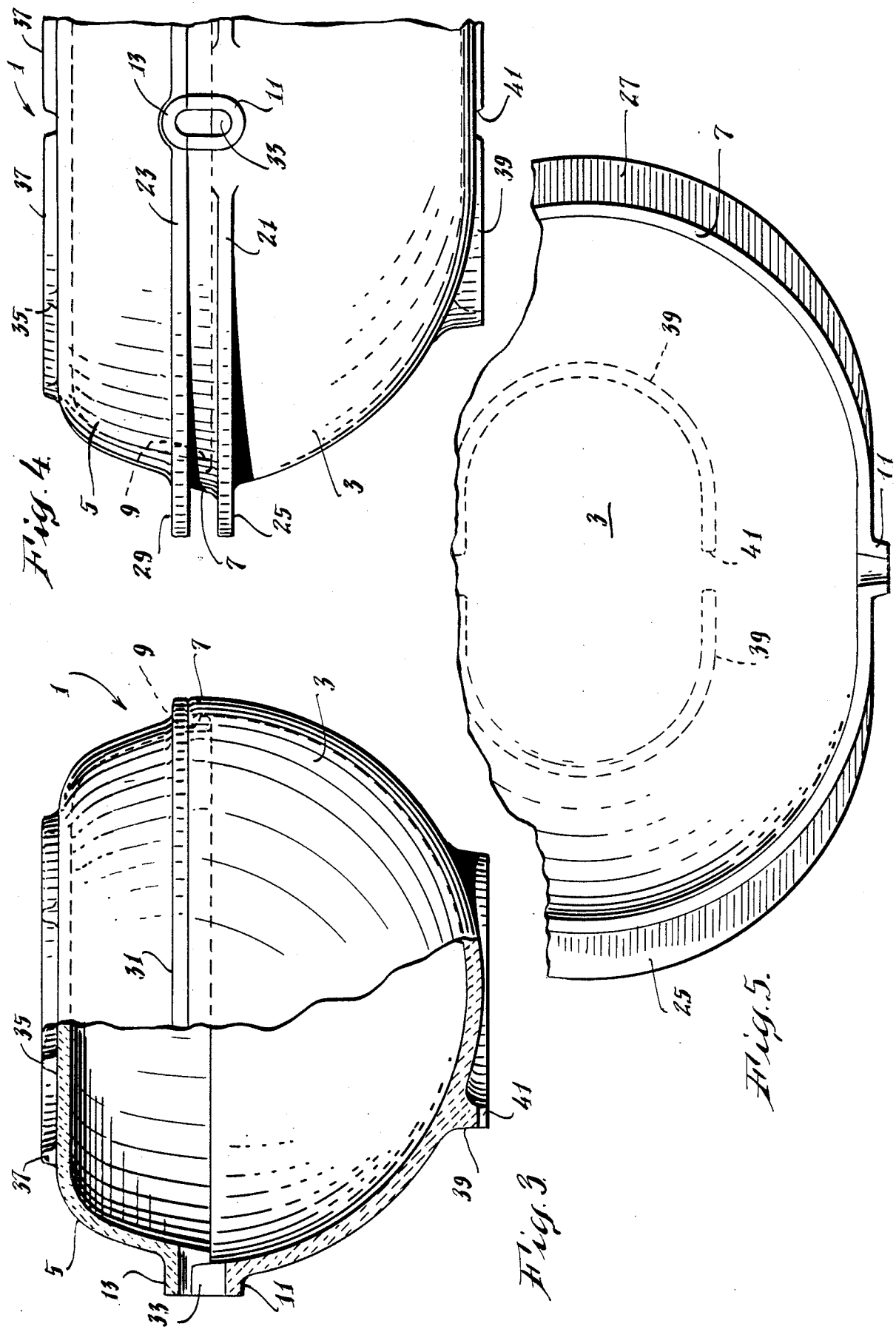

MICROWAVE COOKING AND SERVING DISH

FIELD OF THE INVENTION

This invention relates to the field of microwave cookware, and, in particular, to cookware in which the vessel has two interfitting sections which may be reversed top for bottom and work equally well in either position, and in which the vessel may also be used for serving foods. The interfitting sections provide for temperature probe holes and have peripheral rims defining handle extensions so spaced as to permit grasping the two sections together and permitting finger access between them.

BACKGROUND OF THE INVENTION

Various types of microwave cookware exist in which the vessels are, as here, transparent to microwave radiation so that food in them may be cooked in a microwave oven. Two types of microwave cookware in which applicant is the patentee include Mason et al. 4,140,889 and Mason 4,286,186. Each of these relates to cookware having unique configurations enabling better cooking. Applicant is also the patentee of design patent No. 251,653 relating to microwave cookware and of patent 4,165,855 on a reversible type of baking dish.

SUMMARY OF THE DISCLOSURE

A reversible, double-section microwave cooking vessel is provided which is capable of being used with either section as the base and the other section as the top, with the two sections interfitting. The vessel includes a first bowl and a second bowl, each made of material which is transparent to microwaves. The first bowl has a larger volumetric capacity than the second bowl, and the bowls are of generally semi-cylindrical shape, the preferred shape being that often referred to as a super-ellipse.

Each of the bowls has an upstanding rim along the inner edge of its periphery and flush with the inner surface of the bowl. The rims are complementary and interfitting, with the rim of said first bowl fitting outside the rim of the second bowl. Each of the rims has a probe hole therein, the probe holes in the two bowl sections being aligned when the bowls are interfitted.

There are extending peripherial lips on each bowl which form a pair of handle extensions on each bowl. The handle extensions of each pair extend from opposite sides of their respective bowls and are about ninety degrees removed from the probe hole on the bowls. The handle extensions are so spaced from the periphery of the bowls as to be close enough together when the bowls are interfitted as to permit grasping the pairs between thumbs and forefingers of one's two hands and are far enough apart to permit a finger to come between them to separate the bowls. This spacing is achieved by having the outer rim on one bowl rest on the surface of the lip of the other bowl.

As a result, the bowls may be used reversibly with one on the bottom to hold food during cooking and/or serving and the other to act as a cover.

DETAILED DESCRIPTION OF THE DRAWINGS

Turning to the drawings:

FIG. 3 is an end elevation of the closed vessel, partially cut away to disclose further details.

FIG. 4 is a partial elevation of the side of the vessel showing the relationship between the probe hole and the handle extensions, and showing the spacing of the handle extensions relative to one another.

FIG. 5 is a partial top plan view of the larger of the bowls.

DETAILED DESCRIPTION OF THE DISCLOSURE

Figure 1:
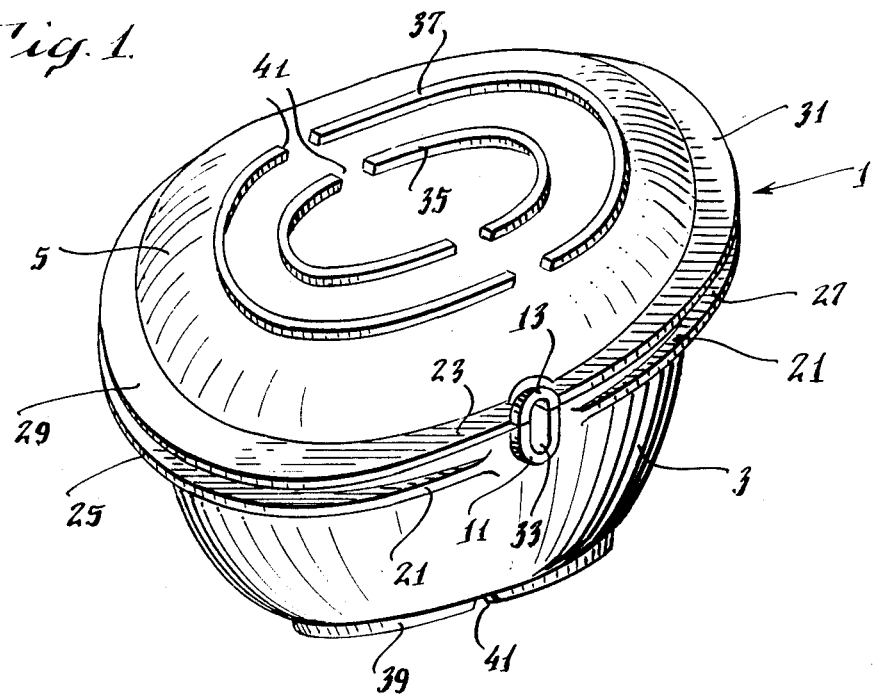
FIG. 1 is a perspective view of my microwave cooking vessel with the larger bowl acting as the base to hold the food and the smaller bowl acting as the cover. If these were reversed, the smaller bowl would hold the food, acting as a platter, and the upper bowl would be the cover.

The assembled cooking vessel 1 of my invention is shown in FIG. 1 and includes larger bowl 3 and smaller bowl 5. The bowls are of a generally hemispherical shape, though somewhat elongated. The preferred cross-sectional shape resembles a super-ellipse. They are made of material that is transparent to microwave radiation, such as plastics or ceramic material. Bowl 3 has a larger volumetric capacity than bowl 5.

Figure 2:
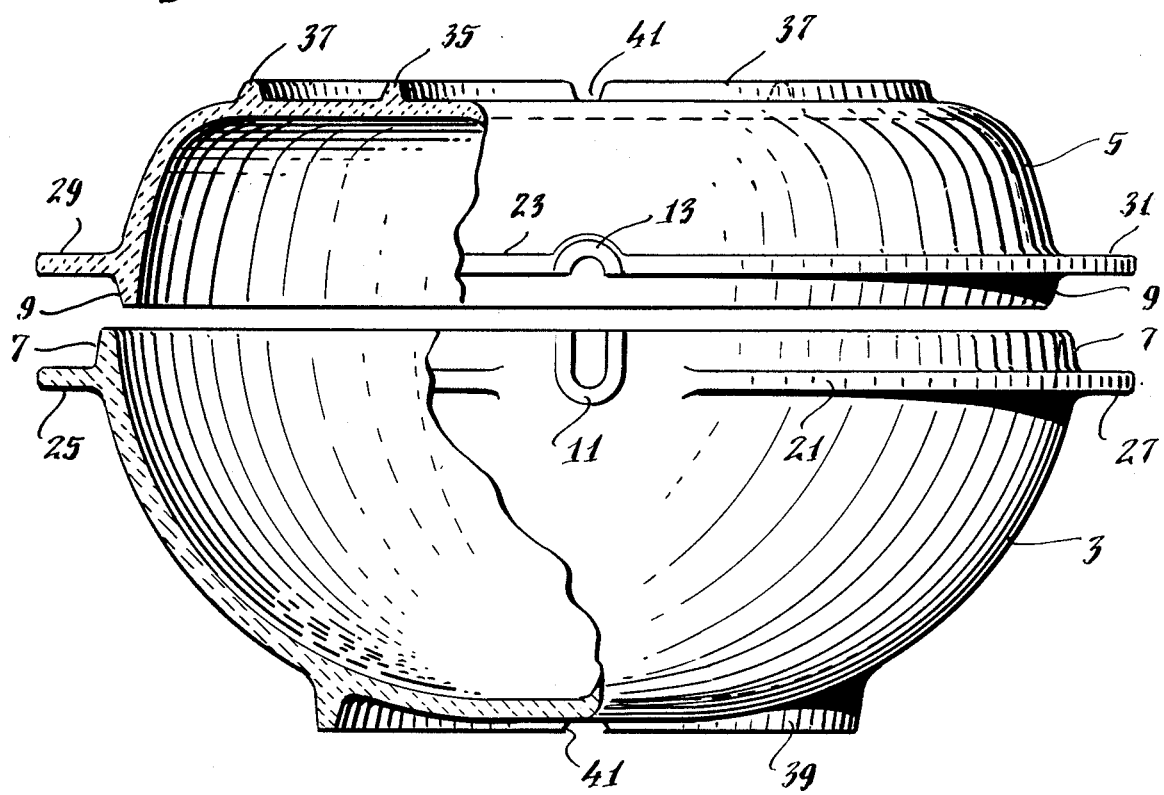
FIG. 2 is a side elevation of the vessel of FIG. 1, partially cut away, and with the cover slightly elevated from the lower bowl.
Figure 6:
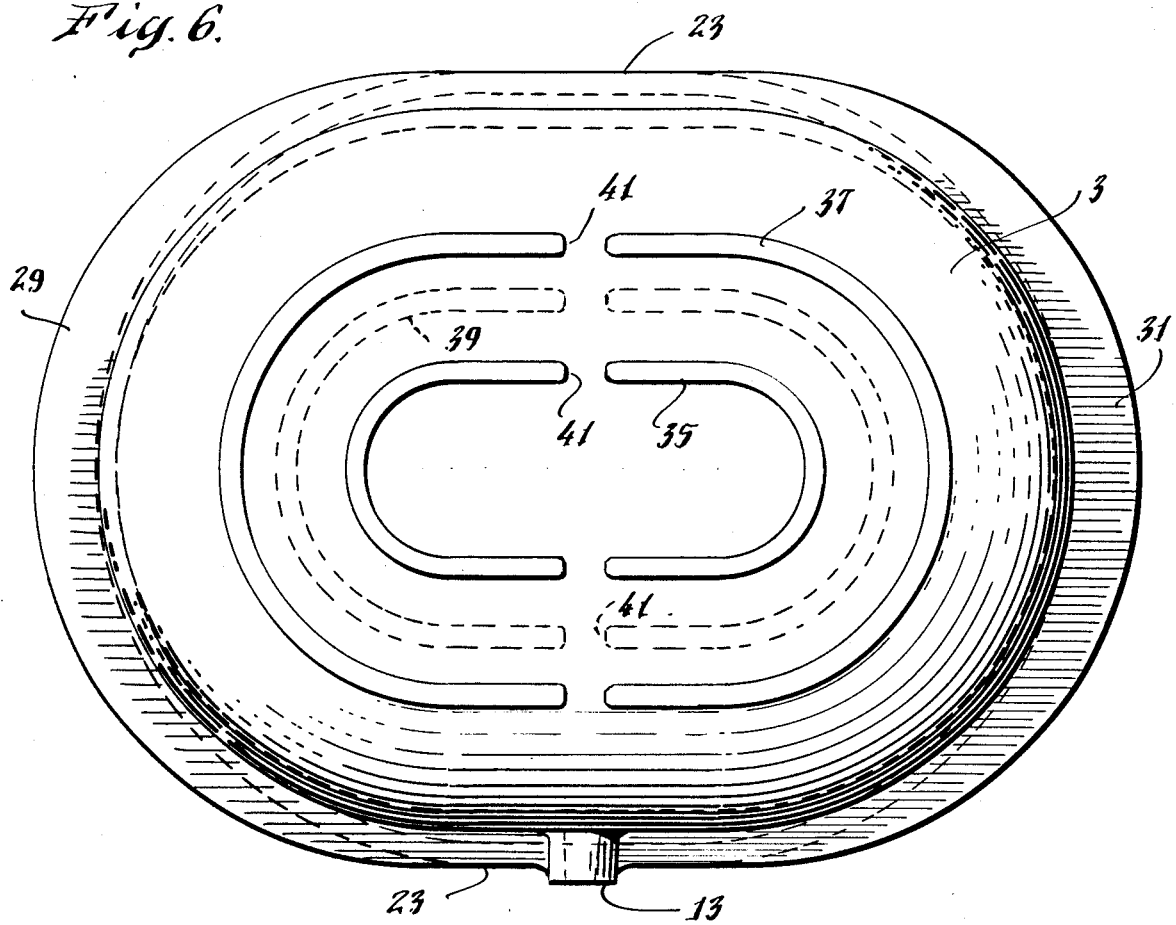
FIG. 6 is a top plan view of the assembled vessel of FIG. 1

Each bowl has a vertically-extending, i.e., upstanding, rim extending outwardly from the inner edge of its periphery and is flush with the inner surface of its bowl. Thus, bowl 3 has rim 7, and bowl 5, has rim 9 (See FIG. 2). Rims 7 and 9 are so shaped and dimensioned that they are complementary to one another and will interfit. This interfitting can best be seen in FIGS. 2 and 3, with rim 9 being smaller than rim 7 and fitting within it. This complementary interfit results in the secure positioning of the cover bowl over the lower bowl.

It should also be noted that, preferably, the rim 9 of the smaller bowl 5 fits within the rim 7 of the larger bowl 3. This is because it is more likely that there will be more steam from cooking juices condensing on the inside of the upper bowl when the larger bowl 3 is used to hold food being cooked. Consequently, with rim 9 fitting witin rim 7, the juices are more likely to be kept inside the bowls.

Rims 7 and 9 have probe holes 11 and 13, respectively, on the front of the bowls. These probe holes pass through the sides of bowls 3 and 5, are aligned, and interfit. As a result, a cooking thermometer or timer can be inserted into the closed vessel 1.

The probe holes 11 and 13 can also be used to drain liquids from the food, and, for that reason, it is best that they be located on the front of vessel 1. By so positioning them, they will be about ninety degrees removed from the handle extensions, described below, and permit easier pouring.

Bowls 3 and 5 have radially-extending lips 21 and 23, respectively, running about the circumferences of the bowls proximate to their rims 7 and 9. When vessel 1 is closed, the outer rim 7 on bowl 3 will rest against lip 23 of bowl 5. As a result, the spacing of the lips from one another when the vessel 1 is closed is determined by the length of the outer rim 7.

It is best that the spacing between the lips 21 and 23 be close enough so that the rims can easily be grasped together between thumb and forefinger for carrying the closed vessel or for tilting it to drain liquids through the probe hole 11 and 13. The lips should, however, also be far enough apart to permit a finger to be inserted between them to separate the bowls to remove that bowl which is acting as a cover.

Lips 21 and 23 need not extend completely around the periphery of the bowls. It is important that they extend out each end as handle extensions far enough to be grasped. By having them at the ends, one above the other and some ninety degrees from the probe hole, they may be readily used to hold and tilt vessel 1 when pouring. Bowl 3 has handle extensions 25 and 27, and bowl 5 has handle extensions 29 and 31. Extensions 25 and 27 are formed from a portion of lip 21, the extensions 29 and 31 are formed from a portion of lip 23.

It can readily be seen that the closed vessel can be used with either of the bowls on the bottom holding the food, and the other on top acting as a cover. Either way the handle extensions can be used both for carrying vessel 1 and for tilting it for pouring. Also, the probe holes may be formed as part of the lips 21 and 23 to form a pouring spout 33. (See FIGS. 1 and 2)

Figure 7:
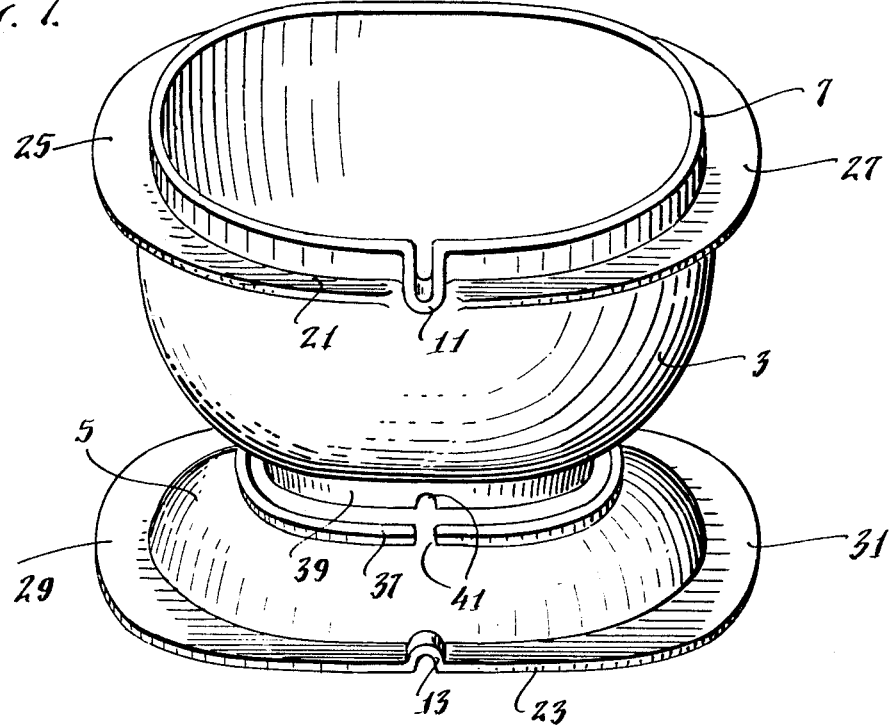
FIG. 7 is a perspective view showing the larger bowl being supported by the lower bowl, which is now serving as a trivet.

The outer top (or bottom, depending upon position) surface of the bowls carry one or more generally circular raised ridges. For example, bowl 5 may have concentric ridges 35 and 37 on its outer surface, and bowl 3 may have ridge 39. The ridges are shaped and dimensioned to interfit. The result is that the several similar vessels may be stacked with ridges interfitting to give stability. These ridges may also be used to interfit the two bowls of one vessel, with what would be the top bowl being place below the bottom bowl to act as a trivet. This latter use is illustrated in FIG. 7. If desired, the ridges may be broken at one or more places to provide vapor release opening for entrapped vapor.

I claim:

1. A reversible, two-section microwave cooking vessel capable of being used with either section on the base and the other section as the top, with the two sections interfitting, said vessel including
    a first bowl and a second bowl made of material which is transparent to microwaves, said first bowl having a larger volumetric capacity than said second bowl, said bowls being of generally similar shape,
    each of said bowls having a vertical upstanding rim along the inner edge of the periphery thereof, said rims being complementary and interfitting, with said rim of said first bowl fitting outside the said rim of said second bowl,
    horizontal peripheral lips on each said bowl, said lips being proximate to, but spaced from, said rims on their respective said bowls, and the outer of said rims of one said bowl resting on the lip of the other said bowl when said bowls are assembled and thereby spacing said lips from one another,
    said lips defining pairs of handle extensions at opposite ends of said bowls and being so spaced from one another when said bowls are interfitted as to permit grasping said pairs between thumb and forefinger of one's hands and far enough apart to permit a finger to come between them to separate said bowls, and
    a probe hole in said rims, said probe hole being aligned in said rims of said bowls and being midway between said pairs of handle extensions at said opposite ends of said bowls,
    whereby said lips together define spaced handle extensions when said bowls are assembled.

2. A reversible microwave cooking vessel capable of being used with either section as the base and the other section as the top, with the two sections interfitting, said vessel including
    a first bowl and a second bowl made of material which is transparent to microwaves, said bowls being of generally semi-cylindrical shape,
    each of said bowls having a vertical upstanding rim along the inner edge of the periphery thereof, said rims being complementary and interfitting with said rim of said first bowl fitting outside the said rim of said second bowl, and the inner surface of said rims forming a smooth surface with the inner surface of its respective said bowl,
    each of said rims having a probe hole therein, said probe holes being aligned to form a single hole, and
    a pair of handle extensions on each said bowl, the extensions of each said pair extending from opposite sides of their respective said bowls and being about ninety degrees removed from said probe hole on each said bowl, and said rib of said first bowl fitting against said handle extension of said second bowl,
    said handle extensions being so spaced from the periphery of said bowls as to be close enough together when said bowls are interfitted as to permit grasping said pairs between thumb and forefinger of one's two hands and far enough apart to permit a finger to come between them to separate said bowls,
    whereby said bowls may be used reversibly with one on the bottom to hold food during cooking and/or serving and the other to act as a cover.

* * * * *